United States Patent
Mitchell

(10) Patent No.: US 10,319,158 B2
(45) Date of Patent: Jun. 11, 2019

(54) SYSTEM FOR MONITORING AND INSPECTING VEHICLE EMISSIONS LEVELS FOR COMPLIANCE

(71) Applicant: BMS-Tek, LLC, Melbourne, FL (US)

(72) Inventor: Kenneth E. Mitchell, Cedar Park, TX (US)

(73) Assignee: BMS-Tek, LLC, Melbourne, FL (US)

( * ) Notice: Subject to any disclaimer, the term of this patent is extended or adjusted under 35 U.S.C. 154(b) by 0 days.

(21) Appl. No.: 15/714,245

(22) Filed: Sep. 25, 2017

(65) Prior Publication Data

US 2018/0033219 A1    Feb. 1, 2018

Related U.S. Application Data

(63) Continuation of application No. 15/165,476, filed on May 26, 2016, now Pat. No. 9,773,355.

(51) Int. Cl.
| | | |
|---|---|---|
| G07C 5/00 | (2006.01) | |
| G01M 15/10 | (2006.01) | |
| H04L 29/06 | (2006.01) | |
| H04L 29/08 | (2006.01) | |

(52) U.S. Cl.
CPC .............. G07C 5/008 (2013.01); H04L 67/12 (2013.01); H04L 67/42 (2013.01); G01M 15/102 (2013.01)

(58) Field of Classification Search
CPC .............................. G07C 5/008; G01M 15/102
See application file for complete search history.

(56) References Cited

U.S. PATENT DOCUMENTS

| | | |
|---|---|---|
| 4,166,437 A | 9/1979 | Bianchi |
| 4,178,883 A | 12/1979 | Herth |
| 4,641,625 A | 2/1987 | Smith |
| 5,219,228 A | 6/1993 | Ker |
| 5,394,330 A | 2/1995 | Horner |
| 6,155,212 A | 12/2000 | McAlister |
| 6,289,871 B1 | 9/2001 | Brown et al. |
| 6,636,790 B1 | 10/2003 | Lightner |
| 6,775,602 B2 | 8/2004 | Gordon, Jr. et al. |
| 6,845,314 B2 | 1/2005 | Fosseen |
| 8,428,814 B2 | 4/2013 | Tripathi |
| 8,843,263 B2 | 9/2014 | Willard |
| 2005/0173523 A1 | 8/2005 | Yushio |
| 2005/0029872 A1 | 10/2005 | Lange |
| 2008/0312786 A1* | 12/2008 | Day ...................... G07C 5/008 701/31.4 |
| 2009/0078236 A1 | 3/2009 | Gallagher |
| 2009/0306850 A1 | 12/2009 | Lee |
| 2011/0166769 A1 | 7/2011 | Buechler |

* cited by examiner

*Primary Examiner* — Todd M Melton
(74) *Attorney, Agent, or Firm* — Ferdinand M. Romano

(57) ABSTRACT

Systems and methods for reporting data based on monitored emissions levels. An exemplary system automatically provides emissions level data acquired from an engine operating in a roadway vehicle while the vehicle is in motion. Data is made available for vehicle approval by a roadway inspection authority. For example, NOx emissions may be monitored with a sensor positioned in the engine exhaust flow path. Embodiments of the invention provide solutions to reduce time delays associated with inspections.

8 Claims, 2 Drawing Sheets ated emissions compliance reporting (AECR) system 2 according to an embodiment of the invention. The AECR system operates over a network 3 which acquires emissions related data, including data transmitted to network nodes at inspection facilities 4. The data follow common protocols for identifying vehicles 6 enrolled to automatically report emissions data through radio communication. The system 2 enables transmission of emissions data 8 in a designated report format for determining environmental compliance of a vehicle 6 while traveling over a roadway. The illustrated vehicle 6 is a heavy truck which operates with a CI engine 7 burning diesel fuel. The emissions data is collected on board the vehicle 6 and the data are initially transmitted over a wireless link between the vehicle 6 and a network server

SYSTEM FOR MONITORING AND INSPECTING VEHICLE EMISSIONS LEVELS FOR COMPLIANCE

RELATED APPLICATIONS

This application is a continuation of application Ser. No. 15/165,476, filed May 26, 2016, which claims priority to U.S. Provisional Patent Application Ser. No. 62/166,884, filed May 27, 2015, and is related to U.S. Provisional patent application Ser. No. 14/690,719, filed Apr. 20, 2015.

FIELD OF THE INVENTION

The present invention relates to emissions control management for internal combustion engines and, more specifically, to systems and methods which report vehicle exhaust emissions levels to assure compliance and avoid non-compliant status.

BACKGROUND AND SUMMARY OF THE INVENTION

Development and deployment of technology to achieve air quality emissions limits is generally recognized as burdensome on the economy. This may be especially true for commercial ground transportation (e.g., the trucking industry) because Compression Ignition (CI) engines present a more difficult set of technical challenges in relation to control of certain emissions such as $NO_2$ and $NO_3$ (referred to herein as $NO_X$) than challenges presented by Spark Ignition (SI) engines. Compliance of CI engines with current and future emissions levels requires further advancements in combustion treatment technologies specific and unique to CI engines.

In addition to purchase and maintenance of emissions control equipment, operator costs of compliance are impacted by multiple factors that cause $NO_X$ emissions from a CI engine to change without warning. These include changes in driving conditions and changes in engine performance (such as caused by normal wear or unanticipated need for maintenance, including leaks or ineffective post-combustion treatment). There are also substantial costs associated with regular monitoring of vehicle emissions for compliance and enforcement. The costs of compliance are impacted by the way emissions control equipment is maintained.

The costs of compliance are also impacted by the way compliance is monitored. In many political regions enforcement of $NO_X$ emissions standards for operation of CI trucks is normally had by routine monitoring of exhaust $NO_X$ emissions levels at inspection stations. In the United States, this occurs after a vehicle, in route to an interstate destination, crosses political boundaries. Emissions inspections often impose substantial delays in vehicle transit. In part, this may be because, prior to undergoing an inspection, the vehicle operator is not aware if a vehicle is non-compliant with emissions limits. Failure to meet emissions level limits can subject the vehicle to delays and monetary penalties.

Systems and methods are provided for reporting data based on monitored emissions levels. Embodiments of the invention provide solutions to reduce time delays associated with inspections. An exemplary system provides emissions level data acquired from an engine operating in a roadway vehicle while the vehicle is in motion. The data is made available for vehicle approval by a roadway inspection authority. A sensor mounted on the vehicle receives signals indicative of emissions level information from the engine. For example, NOx emissions may be monitored with a sensor positioned in the engine exhaust flow path. A processor based control module, mounted on the vehicle, is coupled to receive and process the signals while the vehicle is in motion. Also while the vehicle is in motion, emissions level information is generated for transmission while the vehicle is in motion. A radio communications system is connected, e.g., via a modem, to transmit data received from the control module to a network for receipt by the inspection authority. In an embodiment of a related method, emissions level compliance is determined for the roadway vehicle by acquiring emissions data from one or more sensors mounted on the vehicle. The sequentially acquired emissions data is stored or processed on the vehicle to provide emissions reporting information for receipt by the inspection authority.

The emissions reporting information is transmitted for approval via a radio link between the vehicle and a network to which the inspection authority is connected to receive the emissions reporting information. In application, inspection authorities in different political units may request different data or differing presentations of data. It may be requested that only the most recently acquired data be provided. For example, the inspection authority may request records of actual data collected over a most recent thirty minute period with vehicle speed data, as well as peak, minimum and average emissions levels as well as variance.

BRIEF DESCRIPTION OF THE FIGURES

These and other features of the invention will be better understood when the following written description is read with reference to the accompanying drawings in which like reference numbers reference like parts throughout, and wherein.

In accord with common practice, the various features described in the written description are not drawn to scale on the figures.

DETAILED DESCRIPTION OF THE INVENTION

Figure 1:
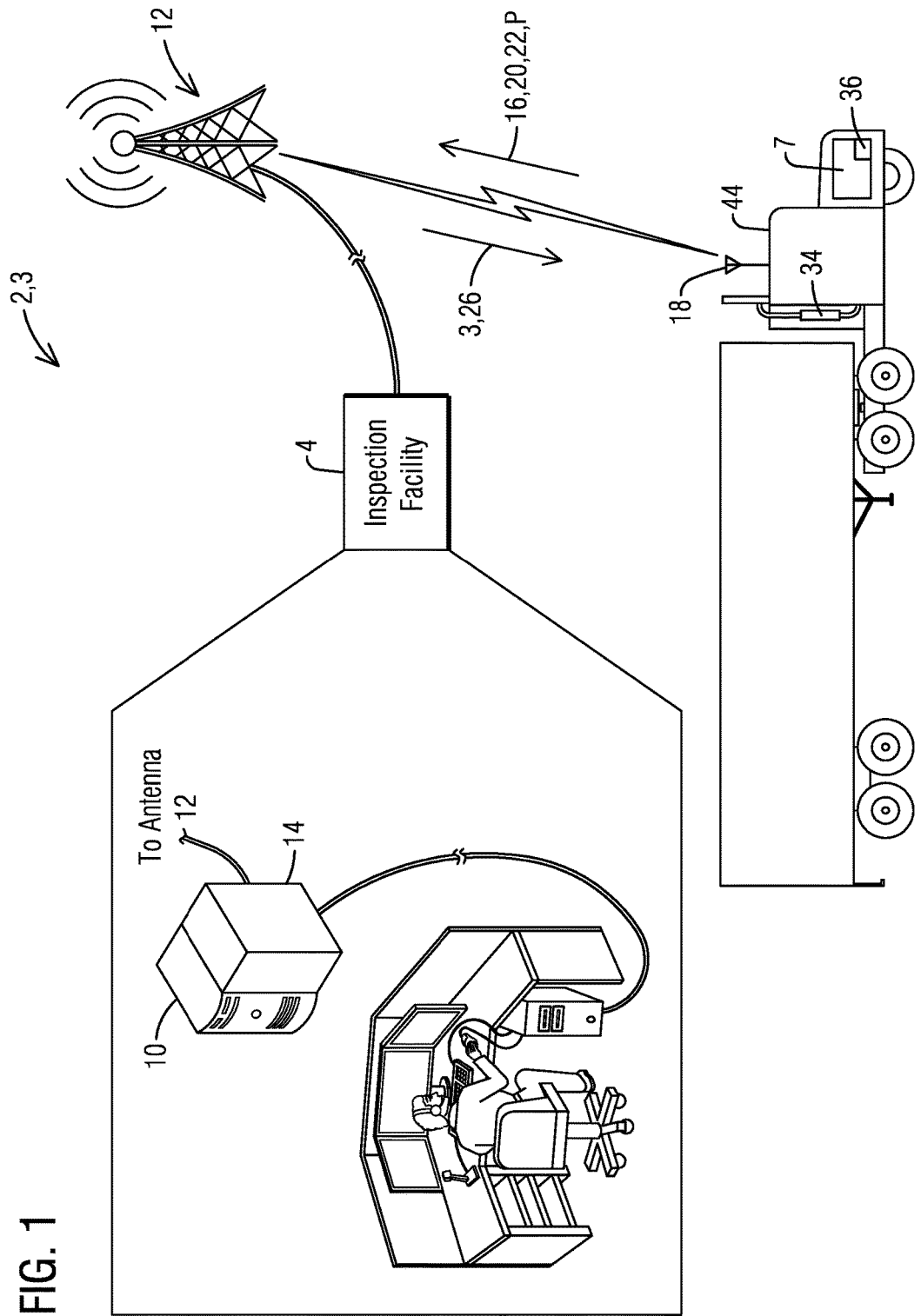
FIG. 1 illustrates an automated emissions compliance reporting (AECR) system for monitoring and reporting emissions data according to an embodiment of the invention.

The invention provides solutions to reduce time delays associated with inspections and enables improved measurement procedures to determine vehicle compliance with emissions levels. FIG. 1 illustrates application of an automated emissions compliance reporting (AECR) system 2 according to an embodiment of the invention. The AECR system operates over a network 3 which acquires emissions related data, including data transmitted to network nodes at inspection facilities 4. The data follow common protocols for identifying vehicles 6 enrolled to automatically report emissions data through radio communication. The system 2 enables transmission of emissions data 8 in a designated report format for determining environmental compliance of a vehicle 6 while traveling over a roadway. The illustrated vehicle 6 is a heavy truck which operates with a CI engine 7 burning diesel fuel. The emissions data is collected on board the vehicle 6 and the data are initially transmitted over a wireless link between the vehicle 6 and a network server 10 which completes a remote compliance inspection of the vehicle by determining whether one or more criteria for emissions level requirements are met. The server 10 may provide the emissions data or related information to other nodes on the network 3. A compliance determination is made while the vehicle approaches the inspection facility 4 of a particular roadway authority. The authority may check for compliance with requirements specific to the political unit in which the authority acts, or may operate with a set of uniform requirements adopted by neighboring political units or a higher level of government authority. The server 10 may be specific to a network operated by or for the entire roadway authority or may be part of a local network specific to the illustrated inspection facility 4. In the example embodiment the server 10 operates over some or all of the larger network 3 in which the AECR system 2 operates, and may support inspection facilities across multiple political boundaries which may have different compliance criteria. As used herein, reference to differing compliance criteria refers to emissions levels specified by laws or regulations in different political units, or to methods or criteria (e.g., test procedures) applied by a roadway authority to establish that compliance is within limits established by law or regulation.

A tower antenna 12 positioned along the roadway is connected to a transceiver system 14 associated with the inspection facility 4. The transceiver system 14 operates in a common frequency band for point to point transmittal of digital data, e.g., 900 MHz, with vehicles enrolled to automatically report emissions data through the AECR system 2. The system 14 periodically beacons an identifying radio signal 16, unique to the inspection facility 4, to an antenna 18 on the vehicle 6 and to other oncoming traffic approaching the facility 4. The identifying radio signal 16 contains (i) a system identifier 20 for the AECR system 6, indicating the facility 4 is a participant on a node of the system 6, (ii) the node address 22 for the specific facility 4 being approached by the vehicle 6, to which a compliance report 26 is to be sent and (iii) designation of one or more sets of protocols, P, defining how emissions data is to be compiled and analyzed in the compliance report 26.

Figure 2:
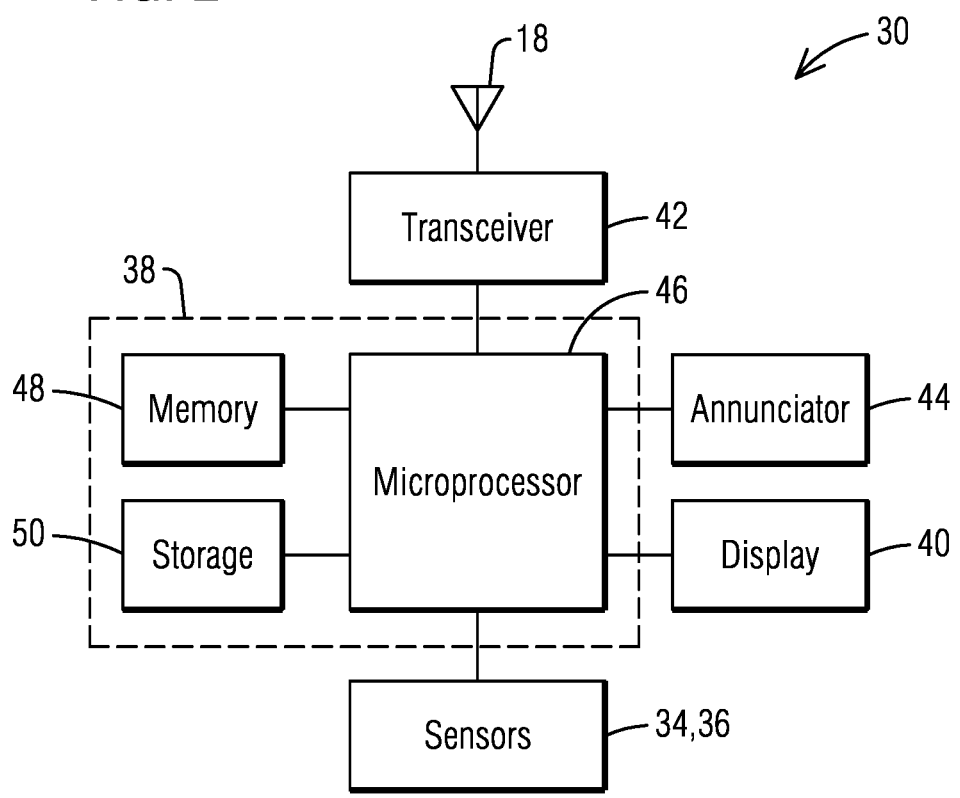
FIG. 2 is a block diagram schematically illustrating exemplary components of a vehicle monitoring and reporting (VMAR) system.

The AECR system 2 is described for an example of monitoring vehicles powered with CI engines for compliance with regulated NOx emissions levels, but this is only exemplary of monitored data. Other vehicle types, such as those using spark ignition may be monitored. Other emissions data or vehicle operations information (e.g., fuel economy) may also be monitored on board the vehicle and transmitted to the roadway authority. Referring also to the schematic diagram of FIG. 2, the vehicle 6 is equipped with a vehicle monitoring and reporting (VMAR) system 30 which includes a $NO_X$ sensor 34 (e.g., mounted in the engine exhaust system), one or more additional sensors 36 providing information indicative of engine operation, a processing module 38, a display 40, a transceiver 42 tuned and coupled through the antenna 18 to communicate with the transceiver system 14 of the inspection facility 4, and an annunciator 44. A suitable NOx sensor for monitoring NOx emissions is the Smart NOx Sensor, also referred to as the UniNOx-Sensor available from Continental Trading GmbH Krupsrtasse 105, 60388 Frankfurt am Main Germany.

The exemplary processing module 38 is a conventional computer processing unit having a microprocessor 46, volatile memory 48 and data storage 50. In other embodiments the processing module may be a programmable logic controller (PLC) or a PIC microcontroller (PIC). The processing module 38 includes a monitoring and analysis program 52 loaded from the storage 50 into memory 48. Execution of the program 52 by the microprocessor 46 acquires and converts digital signals transmitted on a CANbus or SPI bus a $NO_X$ levels, either using an algorithm or a conversion table loaded into memory from the data storage medium. The sensor data and the $NO_X$ levels are initially accumulated in memory, and then periodically written to storage 50. The program 52 compiles and processes sensor data for analyses, determination of data features such as maximum levels, formats and issues the compliance reports 26 for delivery to the server 10 for automated approval by the server.

The VMAR system 30 automatically writes NOx emissions level data acquired from the CI engine to data storage 50. In one measurement sequence, the emissions data is collected while the vehicle is moving at normal carrier speeds on the roadway. The processing module is programed to periodically read and store sensor data, e.g., every five seconds while the engine is running. Accumulated emissions data is periodically processed to acquire running averages, maximum values, minimum values and variances over multiple time periods, e.g., during and immediately preceding thirty minute period and during each preceding hour. The processor module may also accumulate engine operating data (speed, intake manifold pressure, fuel consumption, etc.) with the one or more other sensors 36 to confirm that data is acquired under acceptable conditions. The VMAR system 30 is also programmed to provide multiple types of compliance reports to suit varying requirements of different roadway authorities or political units. For example, if the roadway authority has specified a compliance report 26 only containing data collected within a limited period of time before the vehicle transceiver 42 receives the identifying radio signal 16, then the program 52 prepares a compliance report 26 based only on data acquired during the specified time period to generate maximum values, minimum values, averages and variances. Also, recognizing that many roadway authorities routinely perform no-load stationary emissions tests with portable meters (e.g., with the engine running at nearly full throttle), the roadway authority may specify a compliance report which includes correlation data based on emissions data acquired under comparable conditions (e.g., with the vehicle stationary and out of gear). The roadway authority may impose other specific test conditions when acquiring sensor data. For example, a specific range of speed requirements may be imposed on the vehicle 6, and noncompliance may result if the reported vehicle speeds are outside the required range.

The processing module sends status information to the display 40 and the annunciator 44, located in the vehicle driver compartment, in the form of visual display and audio information. The information made available to the driver through the annunciator from the processing module 38 may include any or all of the following: sensor data, alerts based on determinations of emissions level non-compliance, trends identified in the sensor data that indicate need for maintenance, other alerts based on data trends, and warnings of possible future non-compliance based on, for example, predictive modelling. A related feature of the system is the sending of alerts from the server 10 via the transceiver system 14 through the processing module and to the annunciator 44 to provide auditory alerts. Based on the report 26, an alert may, for example, advise the driver that non-compliance has been identified and immediate action must be taken. In other embodiments, communication between the transceiver 42 on the vehicle 6 and the transceiver system 14 of the inspection facility 4 may occur via any of multiple well known modes, including cellular systems.

The processing module 38 may be part of a vehicle emissions control system such as disclosed in U.S. patent application Ser. No. 14/690,719, filed Apr. 20, 2015, incorporated herein by reference, which adjusts engine parameters. The processing module may be a separate unit which only monitors and reports information based on sensor data in a VMAR system.

In addition to reporting NOx sensor data, the program 52 provides a series of tests based on the acquired sensor data and established emissions compliance limits. The emissions compliance limits and the sensor data are compared and sensor data is tested with respect to an emissions compliance limit to determine whether the emissions compliance limit is exceeded. This assessment accounts for measurement errors and may be statistically based to identify occurrences of non-compliance within error limits. The program 52 calculates and monitors the difference between a measured level (or an average of measured levels) and a first predetermined emissions compliance limit (e.g., in terms of monitored sensor levels). The first predetermined emissions compliance limit may be chosen to be lower than an actual $NO_X$ emissions standard which must be met for compliance within a specific political region or unit. The program tracks changes in the calculated difference to ascertain whether the measured emissions levels have drifted toward the first predetermined compliance limit. The program also uses a predetermined second, lower value to monitor when the measured emissions level exceeds a threshold level of concern. The predetermined second value may be chosen to test whether the measured level is relatively close to the first predetermined emissions compliance limit such that immediate action is necessary or prudent to avoid further increase in emissions which could result in non-compliance. That is, the program tracks whether the emissions level has increased to a point that is relatively close to and approaching the first predetermined emissions compliance limit or the actual emissions compliance limit of the political unit.

In one embodiment, emissions data 8 collected within a predetermined distance of the inspection facility 4 is provided in a format for approval by the server 10. Whenever the difference between the measured level (or measured level average) and the emissions compliance limit exceeds the predetermined value, the system 2 alerts the driver of the non-compliance and may identify supporting data in the compliance report for diagnosis. The annunciator 44 advises the driver of the change in status. Similar functions may be performed with the VIMAR system 30 by the program 52. In addition to detecting and alerting the driver of trending or an out of compliance condition, the processing program 52 reports an alert to the driver if the current value or historical aggregate data trending suggest that an alarm condition is likely to occur, e.g., within the next 24 hours, potentially giving the operator time to service the vehicle before it emits excessive $NO_X$.

Another feature of the invention enables interrogation by vehicle emissions inspection authorities to remotely determine vehicle compliance with emissions standards. To effect this method of assessing compliance, the VIMAR system 30 monitors incoming modem connection requests and responds to requests of one or more inspection authorities, e.g., requests having credentials previously provided to and accepted by the vehicle owner/operator. The response to a request includes sending vehicle identification information and current or stored emissions data to the server 10 operating on behalf of an inspection authority. This method enables government run inspection facilities to interrogate a vehicle 6 as it approaches an inspection station or other surveillance point (e.g., when the compliance report 26 is not initially sent by the VIMAR system 30 in response to the identifying radio signal 16) to determine an emissions level. Generally, the invention avoids allocation of manpower and time dedicated to stopping and checking vehicles which are compliant. If a vehicle is compliant the server 10 sends an affirmation via the transceiver system 14 for the vehicle 6 to proceed without stopping. The affirmation would normally be issued on behalf of the inspection authority. If the emissions data provided does not confirm that the vehicle is compliant or if the vehicle does not provide useful data, the vehicle will not receive the affirmation and permission to bypass an inspection station. In this case, the driver may be required to submit the vehicle to undergo manual emissions level testing by inspection authorities.

A system has been described which utilizes the combination of one or more communications systems, sensors, and a data processing system to measure emissions levels and alert either a driver or an owner operator or a government agency regarding performance and compliance of pollution control equipment. The system may also provide the owner operator with information concerning fuel economy.

Advantageously, the VIMAR system 30 provides timely and early warnings to indicate when a vehicle pollution control system fails to meet requirements or has begun to drift from optimal performance. The system also alerts owners of the equipment when the equipment parameters are outside a prescribed range so that repairs can be effected before the vehicle is ticketed. When a government inspection or compliance agency adopts wireless monitoring, emissions monitoring can be had as the vehicle approaches the inspection station or periodically during the sojourn of the vehicle instead of requiring that the vehicle stop at multiple inspection facilities to undergo time and labor consuming emissions inspections.

Systems have been described to make environmental compliance data available to acquire approval by a roadway inspection authority for vehicle operation. A sensor 34, 36 mounted on the vehicle provides signals indicative of emissions levels generated by the vehicle engine 7. For example, NOx emissions may be monitored with a sensor 34 positioned in the engine exhaust flow path. A processor based control module, mounted on the vehicle, is coupled to receive and process the signals while the vehicle is in motion. Also while the vehicle is in motion, emissions level information is generated for transmission while the vehicle is in motion. A radio communications system, comprising the antenna 18 and transceiver 42, is connected, e.g., via a modem, to transmit data received from the processing module in the form of a report into a network 3 for receipt by the roadway inspection authority. In an embodiment of a related method, emissions level compliance is determined for the roadway vehicle 6 by acquiring emissions data from one or more sensors mounted on the vehicle. The sequentially acquired emissions data is stored or processed on the vehicle 6 to provide emissions information in the form of a compliance report 26 for receipt by the inspection authority. The emissions information 8, 26 is transmitted for approval by the roadway inspection authority via a radio link between the vehicle 6 and the network 3 to which the inspection authority is connected to receive the emissions reporting information. In application, inspection authorities in different political units may request different data or differing presentations of data. It may be requested that only the most recently acquired data be provided. For example, the inspection authority may request records of actual data collected over a most recent thirty minute period with vehicle speed data, as well as peak emissions levels, minimum emissions levels, average emissions levels and variance during the period. The radio communications system, comprising the antenna 18 and transceiver 42, may also interface with other networks, including a network operated by the vehicle owner to transmit to the vehicle owner real time emissions information 8 generally, as well as compliance reports 26 sent to inspection authorities.

Although the invention has been described in the context of monitoring NOX emissions, levels, the underlying concepts of the described system are applicable to monitoring other types of emissions from a variety of source types, including other types of vehicle and stationary equipment. The scope of the invention is only limited by the claims which follow.

The claimed invention is:

1. A system which provides emissions level data acquired from an engine operating in a roadway vehicle while the vehicle is in motion for automated approval by a roadway inspection authority, comprising:
   a sensor mounted to receive signals indicative of emissions level information from the engine;
   a processing module coupled to
   (i) receive and process the signals indicative of the emissions level information while the vehicle is in motion and
   (ii) generate emissions level information while the vehicle is in motion for transmittal over a network;
   a radio communications system connected to transmit the emissions level information generated by the processing module to a network for receipt by a server associated with an inspection facility or an inspection authority, where:
   the processing module operates a program rendering the system responsive to receipt of an identifying radio signal by the radio communications system, which identifying radio signal
   (i) identifies an association with the inspection facility or the inspection authority and
   (ii) results in the transmission of the emissions level information for receipt by the server
   (iii) includes information by which designation of one or more sets of protocols or other requirements is determinable, the program causing the system to respond in accord with the one or more sets of protocols or other requirements, the one or more sets of protocols or other requirements taken from the group consisting of:
   (a) a protocol defining how signals are to be processed for confirming emission level compliance for the vehicle while traveling over the roadway,
   (b) a protocol for identifying a vehicle enrolled to automatically send radio communication, and
   (c) a report format for transmitting emissions information; and transmitting the emissions reporting information through a radio communications system to a network server for acceptance or approval of vehicle compliance with an emission level requirement of an inspection or compliance authority.

2. The system of claim 1 where, in operating the program, the processing module generates and sends a compliance report to the server.

3. The system of claim 1 where the processing module generates and sends a compliance report to the server and provides emissions level data to another network for receipt by an owner or operator of the vehicle.

4. The system of claim 1 where the program provides a statistically based test using acquired signal data and an emission compliance limit to determine whether a compliance determination is within error limits or whether a determination of non-compliance is within error limits.

5. A method for confirming emissions level compliance of a roadway vehicle, comprising:
   acquiring emissions data from one or more sensors mounted on the vehicle;
   providing acquired emissions data to a processing module positioned on the vehicle for data accumulation or processing to provide emissions reporting information;
   providing timely and early warnings to indicate when a vehicle pollution control system fails to meet requirements or has begun to drift from optimal performance or equipment parameters are outside a prescribed range so that timely repairs can be effected; and
   transmitting the emissions reporting information for approval of vehicle compliance with emissions levels requirements of an inspection or compliance authority via radio communication between the vehicle and a network to which the authority is connected to receive the emissions reporting information.

6. The method of claim 5 where the emissions reporting information generated by the processing module is sent to a server at an inspection facility associated with the inspection authority.

7. The method of claim 6 where the steps of providing acquired emissions data and transmitting the emissions reporting information for approval include operating a program on a processing module which renders the system responsive to receipt of an identifying radio signal by the radio communications system, which identifying radio signal (i) identifies the inspection facility and (ii) results in the transmission of the emissions level information for receipt by the server.

8. The method of claim 5 further including providing a statistically based test using acquired signal data and an emission compliance limit to determine whether a compliance determination is within error limits or whether a determination of non-compliance is within error limits.

\* \* \* \* \*